United States Patent
Ramaswamy et al.

(10) Patent No.: US 7,919,025 B2
(45) Date of Patent: Apr. 5, 2011

(54) MEMBRANE STRUCTURE AND METHOD OF MAKING

(75) Inventors: Vidya Ramaswamy, Niskayuna, NY (US); Seth Thomas Taylor, Fullterton, CA (US); James Anthony Ruud, Delmar, NY (US); Melissa Suzanne Sander, Denver, CO (US); Anthony Yu-Chung Ku, Rexford, NY (US); Mohan Manoharan, Bangalore (IN)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/687,911

(22) Filed: Jan. 15, 2010

(65) Prior Publication Data
US 2010/0108241 A1     May 6, 2010

Related U.S. Application Data

(62) Division of application No. 11/480,638, filed on Jul. 5, 2006, now Pat. No. 7,669,719.

(51) Int. Cl.
| | |
|---|---|
| B29C 65/00 | (2006.01) |
| C25D 11/04 | (2006.01) |
| B01D 24/00 | (2006.01) |
| B01D 39/00 | (2006.01) |

(52) U.S. Cl. .......... 264/41; 205/324; 205/640; 205/665; 210/490; 210/500.24; 210/502.1

(58) Field of Classification Search ............ 264/41; 210/490, 500.27, 500.25, 502.1; 205/324, 205/640, 665; 96/11; 204/199, 487, 192.35; 156/150
See application file for complete search history.

(56) References Cited

U.S. PATENT DOCUMENTS
4,177,228 A    12/1979   Prolss
(Continued)

FOREIGN PATENT DOCUMENTS
EP       1169743 B1    5/2005
(Continued)

OTHER PUBLICATIONS

Yoo et al., "Synthesis and Characterization of Uniform Alumina-Mesoporous Silica Hybrid Membranes", Langmuir, vol. 22, pp. 1839-1845, 2006.

*Primary Examiner* — Ana M Fortuna
(74) *Attorney, Agent, or Firm* — Paul J. DiConza

(57) ABSTRACT

A membrane structure is provided. The membrane structure includes a first layer having a plurality of pores; and a second layer disposed on the first layer. The second layer has a plurality of unconnected pores. At least a portion of the plurality of unconnected pores of the second layer is at least partially filled with a filler such that the first layer is substantially free of the filler. At least a portion of the plurality of unconnected pores of the second layer is in fluid communication with at least one of the pores of the first layer. A method of making a membrane structure is provided. The method includes the steps of providing a first layer having a plurality of interconnected pores; disposing a second layer on the first layer, and filling at least a portion of the unconnected pores of the second layer with a filler such that the first layer is substantially free of the filler. Disposing a second layer includes depositing a metal layer on the first layer; and anodizing the metal layer to convert the metal layer into porous oxide layer.

2 Claims, 5 Drawing Sheets

U.S. PATENT DOCUMENTS

| | | |
|---|---|---|
| 4,857,080 A | 8/1989 | Baker et al. |
| 5,716,526 A | 2/1998 | Kelemen et al. |
| 5,750,026 A | 5/1998 | Gadkaree et al. |
| 5,753,014 A | 5/1998 | Van Rijn |
| 6,838,297 B2 * | 1/2005 | Iwasaki et al. ................. 438/20 |
| 7,179,430 B1 | 2/2007 | Stobbe et al. |
| 7,228,199 B2 | 6/2007 | Wallace |
| 7,396,382 B2 | 7/2008 | Ku et al. |
| 7,604,746 B2 * | 10/2009 | Childs et al. .................. 210/640 |
| 7,669,719 B2 * | 3/2010 | Ramaswamy et al. ........ 210/490 |
| 7,682,688 B2 * | 3/2010 | Smith ........................ 428/304.4 |

FOREIGN PATENT DOCUMENTS

| | | |
|---|---|---|
| WO | WO2006034717 A1 | 4/2006 |

\* cited by examiner

MEMBRANE STRUCTURE AND METHOD OF MAKING

This application is a divisional of application Ser. No. 11/480,638, filed 5 Jul. 2006 now U.S. Pat. No. 7,669,719, which is hereby incorporated by reference herein in its entirety.

BACKGROUND

The invention relates generally to a membrane structure. More particularly, the invention relates to a membrane structure having high flux and high selectivity. The invention also relates to a method of making a membrane structure.

Porous membrane structures have been extensively used in filtration, separation, catalysis, detection, and sensor applications. Creating membrane structures having fine pores and high flux is difficult, as the flux through the membrane decreases with decreasing pore size, a relationship that urges the use of layers that are as thin as practicable. Fabricating thin porous layers with uniform pores over large surface area and that are mechanically robust is a challenging task. Therefore, thin, fine porous membranes typically are stacked on thicker substrates with coarser pores. In such membrane structures it is extremely difficult to control the layer thickness of the fine pore layer to within a few microns. In spite of much effort, the currently available membrane structures with fine pores exhibit undesirably low permeance. Therefore, it is desirable to improve the efficiency of fine porous membrane structures suitable for high temperature, high pressure, and/or corrosive atmospheres and to develop suitable methods to fabricate such structures.

SUMMARY OF THE INVENTION

The present invention meets these and other needs by providing a membrane structure having high flux and high selectivity. Accordingly, one embodiment of the invention is a membrane structure. The membrane structure includes a first layer having a plurality of pores; and a second layer disposed on the first layer. The second layer has a plurality of unconnected pores, wherein at least a portion of the plurality of unconnected pores is at least partially filled with a filler. At least a portion of the plurality of unconnected pores is in fluid communication with at least one of the pores of the first layer. The first layer is substantially free of the filler.

A second embodiment of the invention is a method of making a membrane structure. The method includes the steps of providing a first layer having a plurality of pores; disposing a second layer on the first layer, wherein the second layer comprises a plurality of unconnected pores; and filling at least a portion of the plurality of unconnected pores at least partially with a filler such that the first layer is substantially free of the filler. Disposing a second layer includes depositing a metal layer on the first layer; and anodizing the metal layer to convert the metal layer into porous oxide layer.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
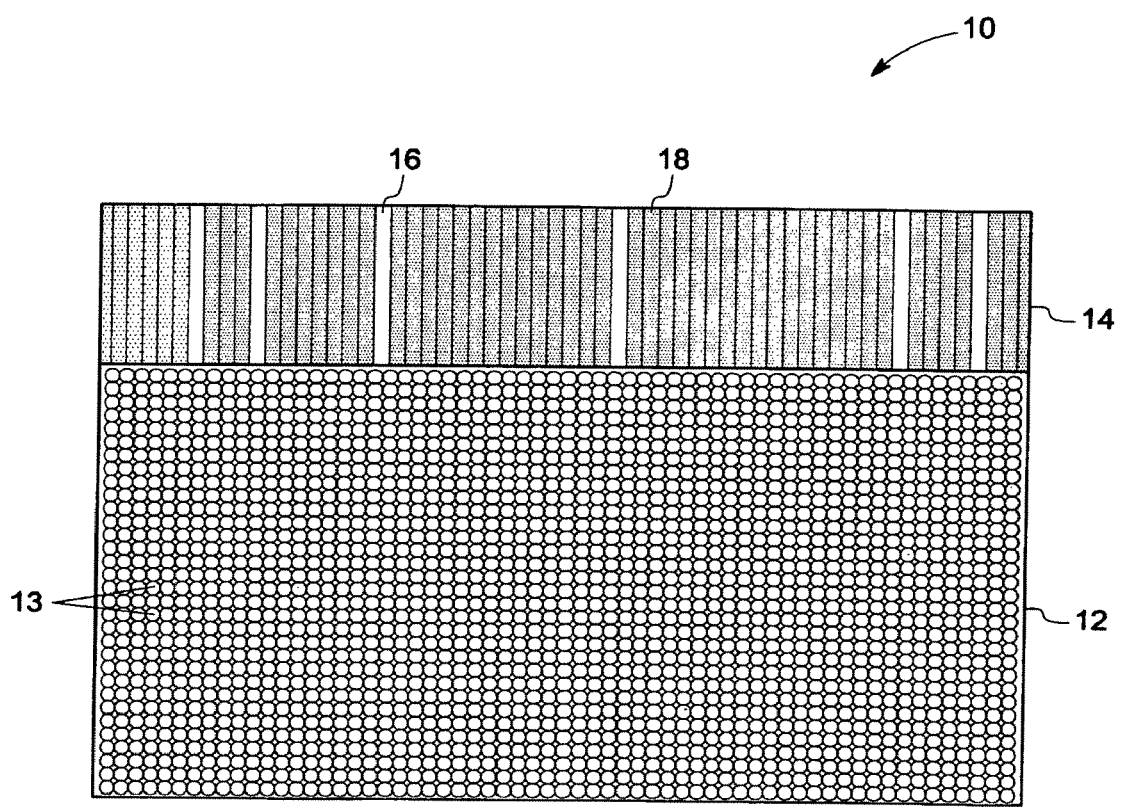
FIG. 1 is a schematic representation of a membrane structure, according to one embodiment of the present invention.

In the following description, like reference characters designate like or corresponding parts throughout the several views shown in the figures. It is also understood that terms such as "top," "bottom," "outward," "inward," "first," "second," and the like are words of convenience and are not to be construed as limiting terms. Furthermore, whenever a particular aspect of the invention is said to comprise or consist of at least one of a number of elements of a group and combinations thereof, it is understood that the aspect may comprise or consist of any of the elements of the group, either individually or in combination with any of the other elements of that group.

Referring to the drawings in general, it will be understood that the illustrations are for the purpose of describing one embodiment of the invention and are not intended to limit the invention thereto.

For the purposes of understanding the invention, the term "layer having a plurality of unconnected pores" is to be understood to be a porous layer containing a substantial number of substantially isolated pores, such as parallel and unconnected channels. In other words, the pores are disposed such that there is only incidental internal fluid communication among the pores. Of course, one skilled in the art will recognize that an occasional defect is to be expected in fabricating such structures, and so a structure containing occasional defects, such as pore channel branches, will still be considered a structure having a plurality of unconnected pores, if the number of defects is not sufficient to substantially alter the performance of the structure relative to what would be expected for a defect-free structure.

A schematic representation of a membrane structure according to one embodiment of the present invention is shown in FIG. 1. The membrane structure 10 of FIG. 1 includes a first layer 12 comprising a plurality of pores 13, and a second layer 14 having a plurality of unconnected pores 16; second layer 14 is disposed on the first layer 12. At least some of the unconnected pores 16 of the second layer 14 are at least partially filled with a filler 18 such that the first layer 12 is substantially free of the filler 18. In such membrane structures the second layer 14 is an "active" layer of the membrane 10, that is, this layer provides desired selectivity and/or functionality, and the first layer 12 provides the desired mechanical stability and support. At least a portion of the plurality of the pores 13 of the first layer 12 is in fluid communication with at least one of the pores 16 of the second layer 14. Typically, a substantial fraction, for example, at least about 75%, of the unconnected pores of the second layer 14 is in fluid communication with at least one of the pores (13) of the first layer 12 to sustain a desirable flux through the membrane structure 10.

Typically first layer 12 includes a layer with a plurality of interconnected or unconnected pores; its primary purpose is to provide mechanical strength to structure 10 and to support high flux of fluid. The first layer 12 may be a porous ceramic, a porous metal or a porous polymer layer. When the first layer 12 comprises a metal layer, the metal may be passivated with a polymer or a ceramic layer. In one embodiment, the first layer 12 has a porosity volume fraction of at least about 1%. In another embodiment, the first layer 12 has a porosity volume fraction in the range from about 20% to about 70%. In yet another embodiment, the first layer 12 has a porosity volume fraction in the range from about 30% to about 50%.

The total thickness of the membrane structure 10 is chosen in such a way that the structure is thick enough for mechanical robustness, but not so thick as to impair permeability. The thickness of the individual layers is optimized depending on the end-use application. As mentioned above, the need for high flux drives the need for fine porous layers to be as thin as possible. In one embodiment, the second layer 14 has a thickness less than about 10 micrometers. In certain embodiments, the second 14 layer has a thickness in the range from about 10 nanometers to about 1 micrometer. In particular embodiments, the second layer 14 has a thickness in the range from about 10 nanometers to about 200 nanometers. As will be described in more detail, below, the methods used for the fabrication of the membrane enable very good control over the thickness and pore structure of the layers.

Precise control over pore size and pore size distribution, especially those of the second layer 14, are among the parameters that define the overall membrane structure performance. The pore size of the layers is chosen based on the end use application of the membrane structure 10. In some embodiments, the second layer 14 has a median pore size of less than about 1 micrometer. In certain embodiments, the median pore size of the second layer 14 is in a range from about 1 nanometer to about 500 nanometers. In particular embodiments, the median pore size of the second layer 14 is in the range from about 1 nanometer to about 100 nanometers.

The plurality of pores in the second layer 14 has at least one pore architecture. A "pore architecture" is a plurality of parallel pores having a particular average size and morphology. Typically, for each pore architecture, the pore size distribution does not vary considerably compared to the value of the median pore size of that architecture. However, some variation is tolerable as long as the performance of the membrane is not adversely affected. In some embodiments, the plurality of pores may comprise at least two pore architectures; in such cases the plurality of pores may have a plurality of size ranges. In all the above embodiments, the pore size of the first layer 12 is chosen so that the pores do not unduly hinder the permeance of the species through the membrane structure. In an exemplary embodiment, the second layer 14 includes a plurality of cylindrical pores of uniform size, with substantially all pores aligned approximately perpendicular to the membrane surface.

At least some of the pores of the second layer 14 are at least partially filled with a filler 18. In certain embodiments, at least about 50% of the pore volume is filled with the filler 18, in other embodiments, at least about 75% of the pore volume is filled with the filler 18. In certain embodiments, the filler 18 completely fills at least some of the unconnected pores 16. The first layer 12 is substantially free of the filler 18. In certain embodiments, the filler 18 comprises a porous material. Alternatively, the filler 18 may be a dense material. In embodiments where the filler 18 is porous, the porous filler has a median pore diameter of less than about 50 nanometers. In certain embodiments, the porous filler has a median pore diameter in the range from about 0.5 nanometer to about 20 nanometers. In certain embodiments the filler disposed in at least one pore of the second layer comprises a different material from the filler disposed in another pore of the second layer. In certain embodiments, a pore may be filled with more than one kind of filler material. For example, a pore may be filled partly with one filler material and partly with another filler. Moreover, the filler may comprise more than one chemical species, such as, for instance, a mixture of more than one type of oxide, or a mixture of metal with metal oxide. In certain embodiments, the pore walls of the filler porous material may be functionalized with a functional material, as will be discussed in detail below.

The filler 18 typically comprises a ceramic, a metal, or an organic material. Examples of suitable ceramic materials include, but are not limited to, oxides, borates, aluminates, silicates, and phosphates, individually or in any combination thereof. In one embodiment, the filler material comprises an oxide. Examples of suitable oxides include, but are not limited to, oxides of silicon (Si), titanium (Ti), aluminum (Al), zirconium (Zr), niobium (Nb), tantalum (Ta), tungsten (W), tin (Sn), hafnium (Hf), iron (Fe), cerium (Ce) and yttrium (Y) in their stoichiometric or non-stoichiometric forms, either individually or in any combination thereof. In certain embodiments, the filler may comprise a complex oxide of more than one metal of the form $ABO_x$, where A includes, but is not limited to, Mg, Ca, Ba, and Sr, and B includes, but is not limited to, Zr, Ti, Si, and Al. The filler may also comprise doped oxides such as yttria stabilized zirconia, and the like. In a particular embodiment, the oxide comprises silica ($SiO_2$). In another particular embodiment, the oxide comprises titania ($TiO_2$). In one embodiment, the filler material comprises a plurality of compositions. The plurality of compositions may comprise, for example, any combination of the oxides listed above. Furthermore, the composition may be doped with any desired dopant.

In certain embodiments, the filler material comprises a metal. In one embodiment, the filler material comprises a transition metal. In particular embodiments, the filler material comprises a platinum group metal, iron, nickel, cobalt, copper, or combinations thereof. In one embodiment, the metal comprises palladium. Palladium has high permeance for hydrogen and is advantageous for hydrogen separation applications. In certain embodiments, the filler material comprises alloys of the above listed metals.

In certain embodiments, the filler material comprises an organic material. In certain embodiments, the organic material comprises a polymer. Examples of suitable polymers include, but are not limited to, a polysulfone, a polyamide, a cross-linked polyimide, a polyether ketone, a polyetherimide, a silicone rubber, a nitrile rubber, a neoprene rubber, a silicone, a polycarbonate, a polyarylene, a polyphenylene ether, a polyolefin elastomer, a polybutadiene, a poly-ionomer, a polyionic liquid, a polyethylene oxide, a polypropylene oxide, a vinyl polymer, a polynorbornene, a cellulose acetate, a polydimethylsiloxane, a polyvinylidene fluoride, a polynorbornene, and combinations thereof. In one embodiment, the polymer comprises a copolymer. In certain embodiments the copolymer may be a block copolymer. In certain embodiments, the polymer comprises a liquid polymer.

The filler material may further comprise a plurality of nanoparticles, each having a diameter that is less than the size of the unconnected pores 16 of the second layer 14. In one example, the plurality of nanoparticles comprises semiconductor nanocrystals. In another example, the plurality of nanoparticles comprises a ceramic material, as described above.

The filler material provides a wide variety of candidate materials and surface characteristics, which may be useful for functionalization and selective adsorption. The porous filler material advantageously provides pore size ranges smaller than those of the unconnected pores. By filling the pores of the second layer 14 with a porous filler material, it is possible to achieve pores with controlled diameters and pore morphology.

Though typically, the filler is disposed in the pores of the second layer 14, and the first layer 12 is substantially free of the filler 18, in certain embodiments the first layer 12 may have a second filler material. The second filler material, in some embodiments, comprises a moisture sorbent, or a catalyst. Such structures may be advantageous for pre-treatment, such as moisture removal, to be performed on the fluid passing through structure 10 prior to passing through the active second layer 14.

The materials of the first layer 12 and the second layer 14 are chosen based on the end use application. Typically the first layer 12 includes either a polymer or a ceramic with suitable porosity, pore dimensions, and thickness. In an exemplary embodiment, the first layer 12 includes a ceramic. Non-limiting examples of ceramics are an oxide, a carbide, a nitride, a boride, and a silicide. Examples of suitable ceramics include, but are not limited to, aluminum oxide, silica, silicate, rare-earth oxide, titania, zirconia, lanthana, yttria stabilized zirconia, a perovskite, a spinel, vanadia, ceria, and combinations thereof. In some embodiments, the ceramic may include a suitable dopant. Ceramic materials have the advantages of thermal and chemical stability, good erosion resistance, and high-pressure stability. Thus the membrane structures of the embodiments may withstand prolonged exposure to pressure or temperature differences that may be present in, for example, a gas separation or sensor assembly.

In some embodiments, the first layer 12 includes a polymer. Examples of suitable polymers include, but are not limited to, a polysulfone, a polyamide, a cross-linked polyimide, a polyether ketone, a polyetherimide, a silicone rubber, a nitrile rubber, a neoprene rubber, a silicone, a polycarbonate, a polyarylene, a polyphenylene ether, a polyolefin elastomer, a polybutadiene, a poly-ionomer, a polyionic liquid, a polyethylene oxide, a polypropylene oxide, a vinyl polymer, a polynorbornene, a cellulose acetate, a polydimethylsiloxane, a polyvinylidene fluoride, and various combinations thereof. In one embodiment, the polymer comprises a copolymer. In certain embodiments the copolymer may be a block copolymer. These polymers may be used to achieve specific functionalities. For example, silicone rubber is very effective in removing volatile organic components such as toluene, methanol, methylene chloride, and acetone from gas streams.

In certain embodiments, the first layer 12 includes more than one sublayer. In such embodiments, a sublayer not in contact with the second layer may include an unpassivated metal. A pure metal or a metal alloy may be used. The metal may be applied on the membrane layers as a dispersed particulate, or a continuous coating, or a metal layer may be inserted into the membrane structure. In some embodiments, the pore walls of first layer 12, the second layer 14, or the porous filler may be coated with a metal. The metal may be disposed into the membrane structure 10 by any known coating technique, including exposing the structure to a suspension of metal particulates; electroless deposition; electroplating; chemical vapor deposition; or physical vapor deposition techniques. In some embodiments, the metal is a platinum group metal. In one embodiment, the metal comprises palladium, which, as mentioned previously, may be advantageous for hydrogen separation applications. In one embodiment palladium with copper, gold or silver is used. In another embodiment, an alloy of palladium with ruthenium, osmium, nickel, platinum, or a combination of these is used. In some embodiments, the transition metal elements such as iron, nickel, cobalt, or copper may be included in the membrane structure. Many transition metal complexes show selective interaction with molecular oxygen involving reversible chemisorption, and thus may be suitable for oxygen separation. These complexes may include a transition metal ion and a polydentate ligand. Some examples of suitable complexes are Co or Ni or Cu embedded in polyphyrins or oximes, to which axial bases such as nitrogen or sulphur are attached. Selection and production of these complexes are known to those skilled in the art.

Typically, the second layer 14 includes an oxide product of an anodization process. Some examples of such oxides include, but are not limited to, alumina, titania, silica, tin oxide, zirconia, niobium oxide, tungsten oxide, molybdenum oxide, tantalum oxide, an aluminosilicate, or combinations of one or more of these. In some embodiments, the second layer 14 may include oxides of metals comprising aluminum, titanium, tin, zirconium, niobium, tungsten, molybdenum, or tantalum. In an exemplary embodiment, the second layer 14 comprises alumina. Such oxides have the advantages of thermal and chemical stability, good erosion resistance, and high-pressure stability.

In certain embodiments, the second layer 14 comprises more than one sublayer. In certain embodiments, at least one sublayer in the plurality of sublayers comprises a different value than another sublayer in the plurality, for at least one parameter such as a median pore size, sublayer thickness, and the like, depending on the requirement of the end use application. Each of the sublayers comprises a plurality of unconnected pores, and the porous structure of these sublayers, like that of the second layer in general, is in fluid communication with one or more pores of the first layer 12, to allow fluid flow through the membrane structure 10.

In one embodiment, the sublayers of the second layer 14 may have a monotonic variation in pore dimension across the layer thickness; that is, the pore diameters vary systematically across the layer thickness. For example, the pore diameter may increase or decrease systematically across the height of the layer. In certain embodiments, the sublayer exposed to the surface has a finer pore size than a sublayer disposed beneath it. Alternatively, in another embodiment, the sublayer exposed to the surface has a coarser pore size than a sublayer disposed beneath it. In another embodiment, the sublayers may have a nonmonotonic variation in pore dimension across the membrane. The thickness and pore dimensions of each of the layers are chosen depending on the end use application.

By tuning the pore dimensions, the properties of the membrane structure 10 may be controlled to provide performance suitable for any of a number of applications. For example, such membrane structures may be utilized as high flux membranes with Knudsen selectivity for gases. If the gases do not interact with the membrane surface, membranes prepared using the method described above could be used to separate gases using a Knudsen mechanism. Membrane structures in accordance with this embodiment of the present invention may allow higher fluxes than for membranes with thicker active layers.

In some embodiments, at least one of the layers includes a catalytic material. For example, a catalytic coating or a catalytic layer disposed within the membrane structure may enable structure 10 to combine membrane separation with catalytic reaction to achieve high efficiency fluid mixture separation. The catalyzed reaction may be used, for instance, to reduce the concentration of one or more of the reaction products within the membrane structure, hence increasing the conversion efficiency. Catalytic materials may also be included in the membrane structure for microreactor or sensor applications. Some examples of catalysts include, but are not limited to, platinum, palladium, copper, copper oxide, ceria, zinc oxide, alumina, combinations thereof, or alloys thereof.

One skilled in the art would know how to choose a catalyst material based on the desired reaction and given working environment, then dispose the desired catalyst into the membrane structure. The catalysts may be disposed onto the structure by a number of coating techniques. They may be deposited by a physical vapor deposition or by chemical means. Examples of physical vapor deposition include, but are not limited to, evaporation, e-beam deposition, ion beam deposition, or a suitable combination of these techniques. The catalyst may also be disposed into the membrane structure by means of chemical vapor deposition, including atomic layer deposition. The pores of the membrane structure may also be filled with a catalyst by simple capillary filling, or by spray coating. In such embodiments, the catalyst to be disposed may be taken as a sol, a solution or a gel. In some embodiments, the pore walls of one or more layers are coated with a catalyst. Alternatively, in some other embodiments, a catalyst layer may be disposed within the membrane structure.

The membrane layers may be functionalized with a suitable functional group to achieve specific functional properties. The functional group, in some embodiments, may be an acid, a basic, an amine, a hydroxyl, a carbonyl, a carboxyl, a mercapto group, a vinyl group, an alkyl, a fluoroalkyl, a benzyl, or an acryl group. These functional groups alter the surface properties of the membrane materials and impart specific properties to the membranes. For example, the functional groups may be used to change the wettability of the membrane pore surfaces to control the flow of fluid through the membrane. Functionalizing the pore surfaces is especially useful for biological or biomedical applications where the membranes desirably be hydrophilic, hydrophobic, lyophobic or lyophilic. The functional groups may be used to control the flow of specific chemical or biological species through the membrane. Specific functional groups may be used to control the attachment of cells or proteins to the membrane structure. For example, the functional groups may also be used to make the membrane structure biocompatible for biomedical applications. The functional groups may be disposed onto the membrane structure by any known coating technique. In some embodiments, the functional group may be attached to the selected regions of the layers by exposing the layers to solutions or vapor or ions including the desired species. Pretreatment of the layers to enhance the adhesion of the functional groups and masking of regions to be protected during coating may be required. Techniques for carrying out such a pretreatment are known to those skilled in the art.

In some embodiments, the membrane structure includes a composite material. The composite may include a ceramic-organic or a ceramic-ceramic composite. Any ceramic including those listed above may be used in the composite. The organic material may include a polymer, an oligomer, or a monomer.

The membrane structure 10 of the embodiments may be useful in a number of applications. In some embodiments, the membrane structure 10 is part of a separation assembly. The membrane structure 10 in certain embodiments of the invention may be capable of molecular sieving suitable for purification of natural gas, or may be applied for separation of various species from a fluid flow, including such applications as air separation, $NO_x$ separation, oxygen separation, and hydrogen recovery from processing gases or feedstock. In one embodiment, the membrane structure 10 of the embodiments may be used for separation of hydrogen from nitrogen, argon, carbon dioxide, or methane. In another embodiment, the membrane structure 10 of the invention may be used for separation of volatile organic components from air streams. In some embodiments the membrane structure 10 is a part of a high temperature gas separation unit. For such applications, a suitable metal or a polymer coating may be applied on one or more layers of the membrane structure. Alternatively, a metal or a polymer layer may be used in conjunction with the membrane structure.

Figure 2:
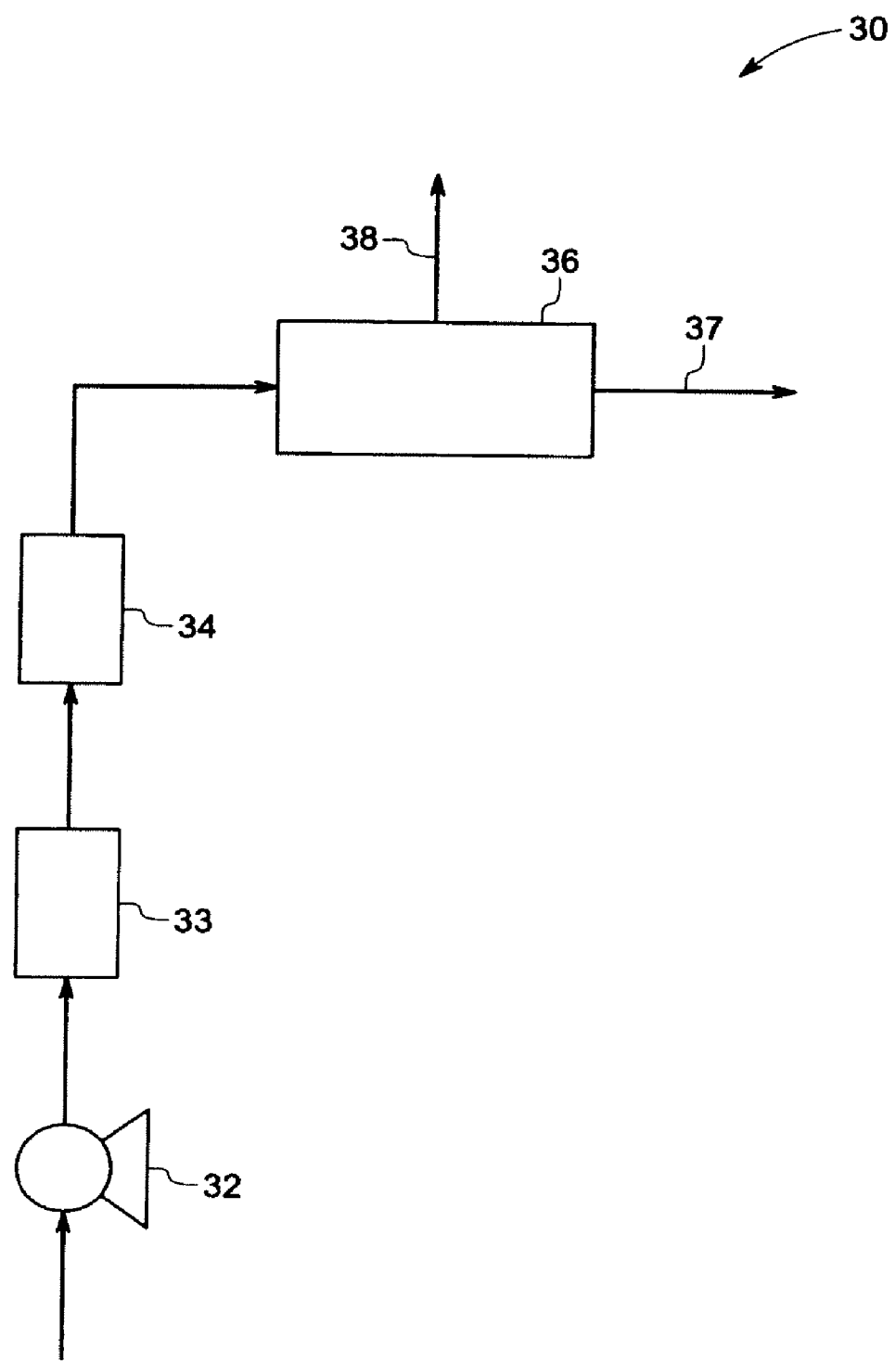
FIG. 2 is a schematic representation of a gas separation assembly incorporating membrane structure of the invention, according to one embodiment of the invention.

FIG. 2 shows a schematic representation of a simple gas separation unit 30 according to one embodiment of the invention. The unit 30 includes a compressor 32, a coalescing filter 33 and a pre-heater unit 34 connected to a membrane separation unit 36. Air under pressure flows first through the coalescing filter 33 and then through the pre-heater unit 34 before reaching the membrane separation unit 36. The coalescing filter may be used to remove oil or water droplets or particulate solids from the feed. The membrane separation unit includes one or more of membrane structure of the invention configured to remove a desired component from the air mixture. The desired component passes through outlet 37, leaving the waste permeate gases through outlet 38. The membrane separation unit may include additional heaters or additional filters.

The membrane structure 10 may be used as a liquid-liquid separation assembly such as separation of water from fluid containing organic components. For such applications, the membrane structure 10 may be combined with other porous or non-porous separation layers if needed. In one embodiment, a separation layer of non-porous cross-linked polyvinyl alcohol layer of suitable thickness is used in conjunction with the membrane structure. The pore structure and thickness of each of the layers may be adjusted depending on the requirement. In some embodiments, the membrane structure 10 may be a membrane structure in a separation assembly that also includes a reactor component coated on the pore walls to prevent fouling.

In one embodiment, the membrane structure 10 is part of a filtration assembly. By controlling the pore dimensions of the layers, the membrane structure 10 of the invention may be used for microfiltration to filter out solid particles with dimensions less than about 10 micrometers, or for ultrafiltration to filter out particles with dimensions down to about 50 nanometers such as separation of macromolecules and bacteria. By choosing the pore dimensions of the layers to very small sizes, it is possible to use these membrane structures for hyperfiltration to filter out still smaller units such as sugars, monomers, aminoacids, or dissolved ions by reverse osmosis. In one embodiment, the membrane structure is a part of a bio-separation or reaction assembly. The pore size and thickness of the membrane layers are chosen depending on the sizes of the species to be separated. Accordingly in one embodiment, the membrane structure 10 is a filter usable in food, pharmaceutical, and industrial applications. In another embodiment, the membrane structure 10 is a part of a protein purification unit.

Figure 3:
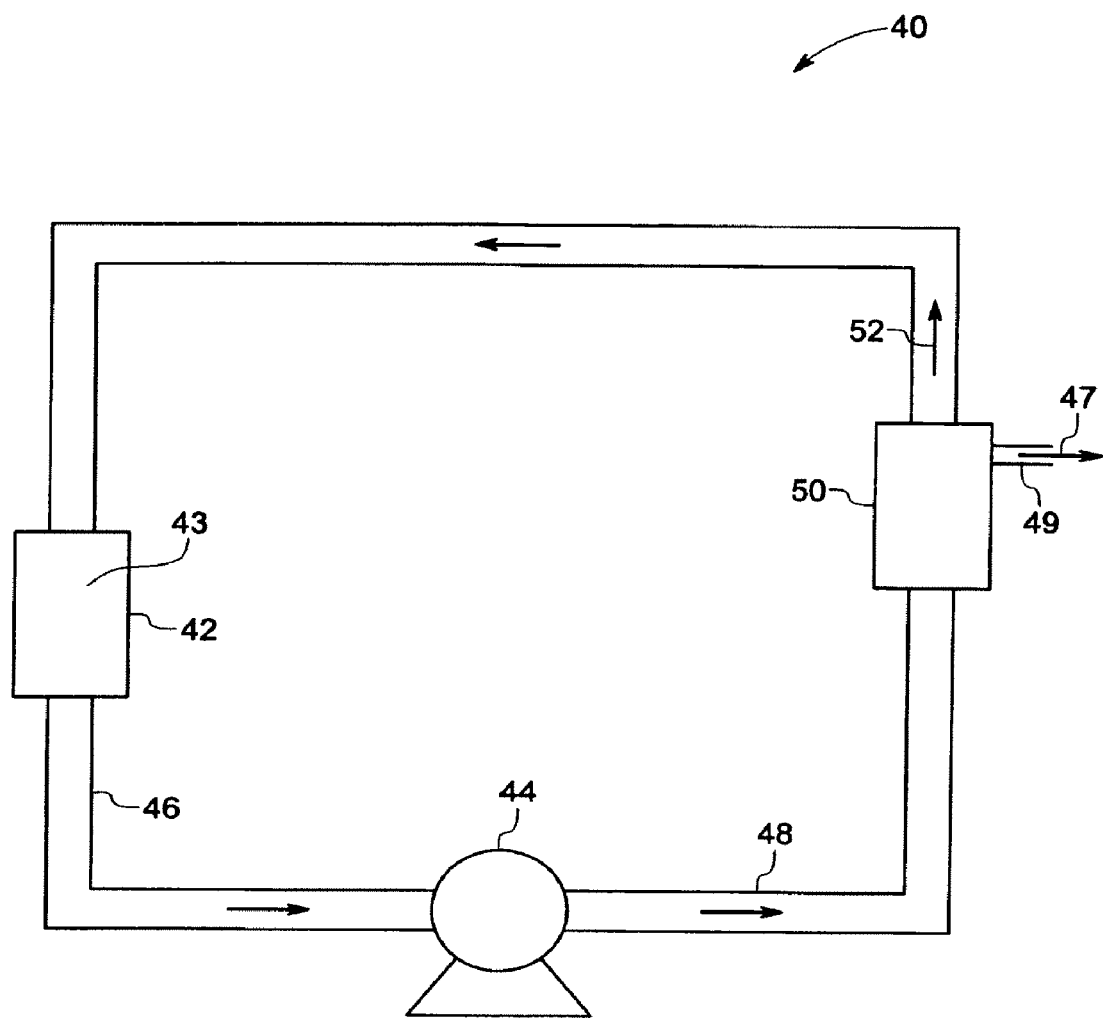
FIG. 3 is a schematic representation of a filter incorporating membrane structure of the invention, according to one embodiment of the invention.

FIG. 3 shows a schematic representation of a simple filter unit 40 according to one embodiment of the invention. The unit 40 includes a feed tank 42 used for storing the liquid medium containing the material to be separated. The circulation of the feed 43 is controlled by the pump 44 that draws the feed 43 through lines 46 and 48 into a membrane filter assembly 50. The membrane filter assembly 50 includes one or more of the membrane structure of the invention configured to filter out a specific component from the feed. The desired component 'filtrate' 47 passes through outlet 49, while the retentate 52 may be removed or returned to the feed tank 42.

In one embodiment, the membrane structure 10 is part of a reactor assembly, performing similar functions to conventional membranes present in reactors such as filtration and separation. In another embodiment, the membrane structure 10 is capable of reactive separation wherein the membrane structure 10 is a reactor that also separates one of the products. In an exemplary embodiment, the membrane structure 10 is a part of a chemical microreactor assembly that generates hydrogen fuel from liquid sources such as ammonia. In such embodiments, suitable hydrogen permselective catalysts are used in the membrane structure.

In one embodiment, the membrane structure 10 is part of a sensor assembly. In such embodiments, the membrane layers may be functionalized with functional groups as discussed above, to incorporate reversible changes within the membrane structure. Examples of reversible changes include, but not limited to, chemical reactions such as ionization, oxidation, reduction, hydrogen bonding, metal complexation, isomerization, and covalent bonding. These changes may be utilized to detect a chemical or a biological species, or to detect change in temperature, pH, ionic strength, electrical potential, light intensity or light wavelength. The use of membrane structures for sensor applications is expected to enhance the performance of detection because of their high surface to volume ratio.

Figure 4:
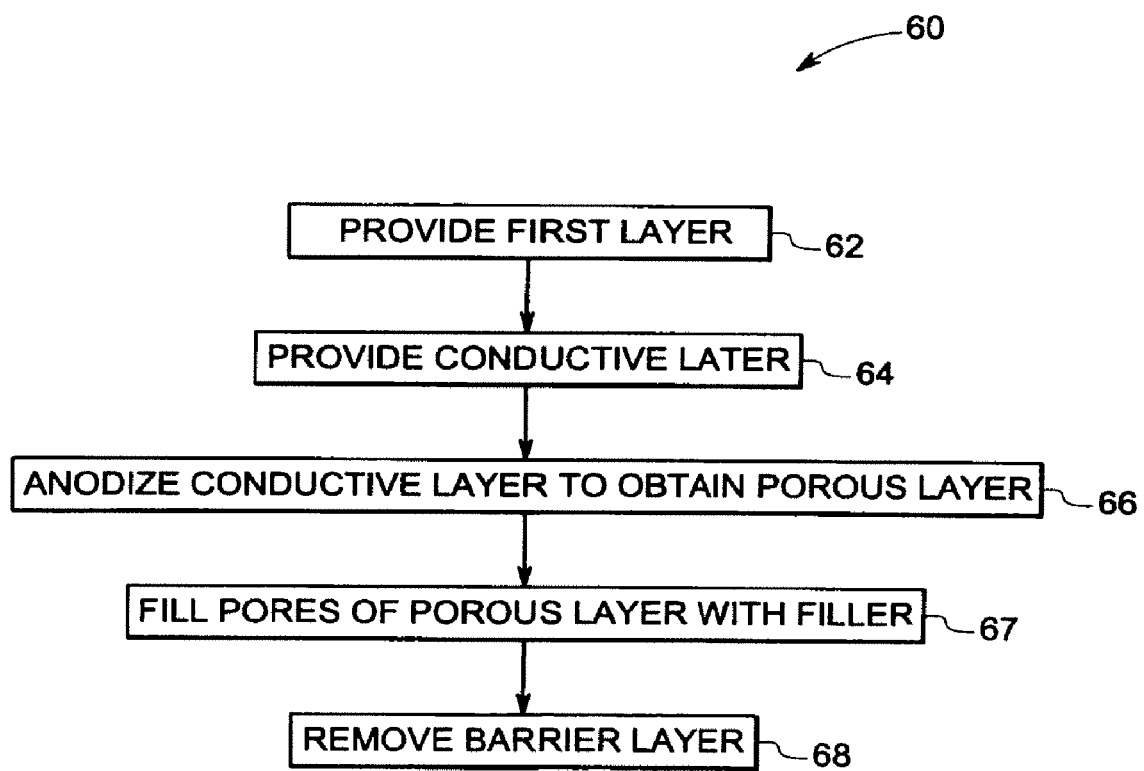
FIG. 4 is a flow chart of a method of making membrane structure, according to one embodiment of invention.

Another aspect of the invention is to provide a method for preparing a membrane structure. A flow diagram of the method of making a membrane structure is shown in FIG. 4. The method 60 begins with step 62, wherein a porous first layer is provided. In step 64, an electrically conducting coating with an outer and an inner surface is deposited on the porous first layer. As used herein, the inner surface is adjacent to the first layer and the outer surface is the surface away from the first layer. In step 66, the electrically conducting layer is anodized in an acid electrolyte to form a porous second layer starting from the outer surface, such that a thin oxide barrier layer is present at the interface between the first layer and the second (anodized) layer. The formation of the barrier layer is a byproduct of the anodization process. In step 67, at least a portion of the pores of the second layer is at least partially filled with a filler material. The first layer is substantially free of the filler because the barrier layer restricts the filler to the second layer. After filling the desired portion of the pores, the barrier layer is removed by etching in step 68 to obtain a membrane structure.

Figure 5:
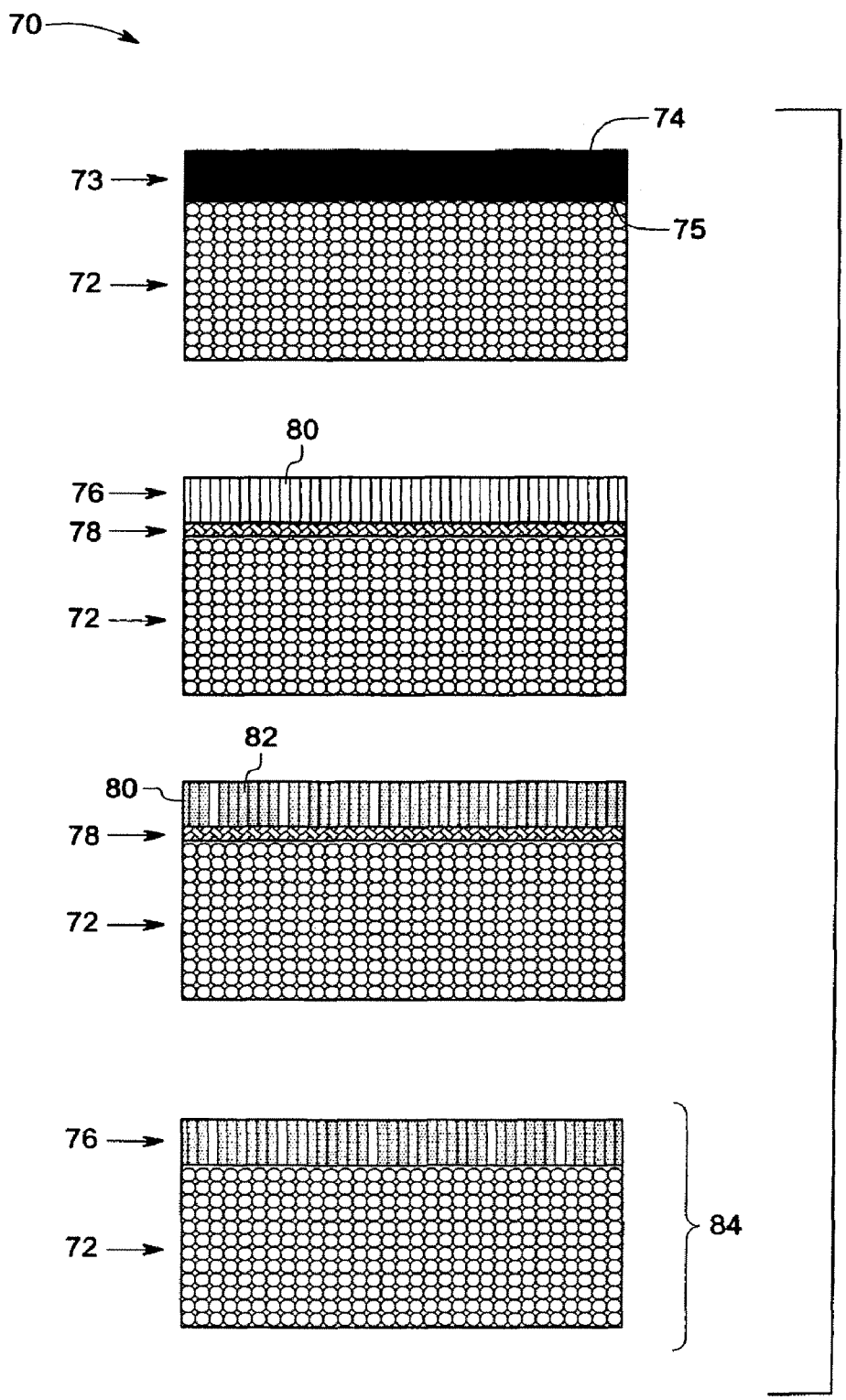
FIG. 5 is a schematic representation of a method of making membrane structure, according to one embodiment of invention.

The schematic of the process steps of a method 70 according to one embodiment of the invention is shown in FIG. 5. To begin with, a porous first layer 72 is provided. Any fabrication technique suitable for fabricating porous layers may be used to fabricate the first layer. In embodiments where the first layer includes a ceramic, the layer may be made by a casting process. To start with, a slurry including the ceramic powder of the desired material is prepared. The slurry may include a binder and a curing agent. The amount of powder in the slurry is generally adjusted to have the rheological properties suitable for casting. Further additive agents may be mixed into the slurry, such as a dispersing agent for improving the dispersibility and to prevent rapid settling, and a plasticizer for improving the binding force between the binder and the ceramic particles and to lower the risk of cracking. Typically a layer is formed on a substrate by applying the slurry on the substrate. Any technique known in the art for preparing layers may be used for forming the first layer. Non-limiting examples of useful formation techniques include, but are not limited to, spraying, screen printing, ink-jet printing, casting, wire-bar coating, extrusion coating, gravure coating, roll coating, and combinations thereof. In some exemplary embodiments, a casting technique, such as tape casting, is used. Tape casting proves useful for making large area thin ceramic sheets with controlled thickness and porosity. The process may include an intermediate a curing process to remove organic binders and solvents and a sintering step to densify the layer. Exemplary sintering techniques may involve heating at a specified temperature for a specified duration, or microwave irradiation, or electron beam irradiation, or UV light exposure, or a combination of those. The porosity, pore size, and pore size distribution is controlled by the particle sizes of starting material. In some cases, it is desirable to start with particles of uniform particle sizes in order to achieve uniform pore structure with minimal pore size distribution. Defect free layers with desired porosity may be obtained by a precise control of sintering conditions.

In embodiments where the first layer includes a polymer, any technique known in the art to make porous polymer layers may be used to fabricate the first layer. For example, a thermoplastic, or a thermoplastic elastomer, or a thermoset polymer may be mixed with a porogen and cast into a thin layer of desired thickness. The layer may be heat treated or exposed to light or any other radiation to convert the layer into a porous layer. When the polymer chosen is a blend of two polymers, it is possible to control the casting conditions, such as the selection of solvents used, to get a porous layer by phase separation.

In step 64, a coating of electrically conducting material 73 having an outer surface 74 and an inner surface 75 is disposed on the first layer 72. The inner surface 75 is adjacent to the first layer 72. The thickness of the second layer is determined by the thickness of the deposited conducting coating. Any coating technique known in the art may be used for depositing the conducting layer. Some examples of suitable coating techniques include, but are not limited to, physical vapor deposition, chemical vapor deposition, and electroless deposition technique.

In step 66, the electrically conducting coating 73 is anodized in an acid electrolyte such that a porous layer 76 is formed starting from the outer surface 74, such that a thin barrier layer 78 is present at the interface between the first layer and the porous second layer 76. The formation of the barrier layer (78) is a byproduct of the anodization process. It is known that certain materials such as aluminium, silicon, tin, titanium, zirconium, niobium, tungsten, molybdenum, tantalum, and their alloys form a porous oxide layer when anodized in an acid medium. The simultaneous formation of oxide layer at the conducting layer surface and dissolution of the formed oxide into the acid give rise to a peculiar porous structure including a plurality of cylindrical pores of uniform size. Typically, a strong acid such as a phosphoric, a sulfuric, or an oxalic acid is used as an electrolyte. The pore size and the spacing between the pores may be controlled by adjusting the voltage during anodic oxidation. The thickness of the oxide film formed is controlled by the thickness of the metal film. Anodization terminates when all the metal is consumed and converted to oxide, leaving a thin oxide barrier between the first and the second layers. Thus a second layer 76 with a plurality of unconnected pores 80 of controlled pore dimension is obtained.

In step 68, the pores 80 of the second layer 76) are filled with filler 82. The filler material may be introduced into the pores of the second layer 76) by any known technique, from the top surface of second layer 76). Examples of suitable filling processes include, but are not limited to, spin casting, injection, spray coating, pressure infiltration, electrophoretic deposition, electrodeposition, and capillary filling of the filler material. The exact process used depends on the nature of the filler material, desired structure of the membrane, cost, and various other criteria.

When the filler material is a porous ceramic, the filler material may be provided in a liquid precursor form. At least one liquid precursor of at least one porous ceramic filler may be provided in a solvent. The solvent may comprise water, methanol, propanol, butanol, or combinations thereof. The solvent mixture may include other less polar solvents to modify or adapt polarity; such solvents include, among others, acetic acid, formic acid, formamide, acetone, methylethylketone, ethylacetate, acetonitrile, N,N-dimethyl formamide, and dimethyl sulfoxide, or any combination thereof. The liquid precursor is provided in an amount sufficient to fill a predetermined number of the pores of the second layer to a predetermined portion(s). In certain embodiments, the liquid precursor comprises at least one template and at least one ceramic precursor. The template provides the organization and size range of the pore architecture. Examples of the template include a cationic surfactant, a non-ionic block copolymer, a protein, an anionic surfactant, a nonionic surfactant, or any combinations thereof. Examples of the ceramic precursor include alkoxides, metal salts, oxide colloidal particles, or any combinations thereof. The liquid precursor may optionally comprise at least one reagent. Examples of a reagent include, but are not limited to, an acid, a base, and a salt, either individually or in any combination. Examples of an acid include, but are not limited to, hydrochloric acid, nitric acid, sulfuric acid, acetic acid, carbonic acid, and citric acid. Examples of a base include, but are not limited to, ammonium hydroxide, sodium hydroxide, and tetramethylammonium hydroxide. Examples of a salt include, but are not limited to, sodium chloride, potassium chloride, sodium acetate, sodium fluoride, and ethylenediaminetetraacetic acid tetrasodium. Furthermore, the liquid precursor may be doped with a desired dopant.

Typically, during any wet chemical method of filling the pores such as dip coating, the bottom surface of the first layer is covered with a mask such that the liquid precursor does not enter the pores of the first layer. The barrier layer 78 present between the first layer 72 and the second layer 76 prevents the filler material from entering the first layer 72. After filling the desired portion of the pores 80 of the second layer 76 with a filler, a portion of the solvent from the liquid precursor is removed to form the liquid precursor into a gel. As an example, the solvent may be removed by evaporation, using temperature-assisted or vacuum-assisted methods, or a combination of the two methods. Subsequently, the barrier layer 78 between the porous oxide layer 76 and the first layer 72 may be removed by chemical etching, for example in a dilute acid or base or in a reducing environment, to obtain a membrane structure 84.

By using different templates or ceramic precursors in each filling stage, adjacent regions with different pore size and or pore organization may be sequentially deposited. Furthermore, the method also provides independent control over the relative size and region of a pore architecture through the order of filling and the extent of shrinkage during the heating step.

It is possible to fabricate membrane structures with different configurations by tuning the anodization conditions. For example, a membrane with more than one sublayer of second layer may be fabricated by changing periodically the anodization parameters. Once the desired thickness of the sublayer is formed, the structure is, for example, anodized at a reduced anodization voltage to obtain a sublayer with finer pores. Using this exemplary technique it is possible to introduce any number of sublayers with sequentially reducing pore dimensions to fabricate asymmetric membranes by tuning the anodization current or voltage.

Anodization of a conducting layer to obtain the active layer of the membrane provides various advantages. This technique enables good control over the thickness of the active layer. Additionally, through the use of the techniques described above, the filler is mainly confined to the pores of the active layer having finer pores and hence the incorporation of the filler into the membrane structure does not adversely affect the flux. Membrane structures of the prior art that incorporate filler materials into porous membranes generally include filler throughout the entire membrane structure and hence the flux through such membrane structures may be undesirably reduced. The integrated membrane structure described herein is superior to such structures due to their good mechanical adhesion between the layers, high flux, and the good fluid communication between the pores of the adjacent layers.

The following example serves to illustrate the features and advantages offered by certain embodiments of the present invention, and is not intended to limit the invention thereto.

EXAMPLE

The following example describes the preparation method for making anodized alumina membrane structures.

A 1-2 µm thick evaporated aluminum film is deposited onto the top surface of a porous alumina substrate. The aluminum film is anodized in oxalic acid (0.3 M). The anodization voltage of between 30 V and 80 V is chosen based on the pore size and spacing requirements. Once the film is fully anodized, the pores in the anodized alumina are separated from the porous support by a continuous alumina barrier layer, a byproduct of the anodization process. The bottom surface of the porous support is masked with paraffin and the sample is dip-coated in a mesoporous silica precursor. The oxide barrier layer prevents the precursor solution from permeating the porous support. The mask prevents permeation into the porous support from the bottom surface of the porous support. Mesoporous oxide is formed by calcining the coated structure. The top surface of the structure is now masked off and then dipped in 5 wt % phosphoric acid, which etches away the barrier layer through the support, without compromising the filler material.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
   providing a first layer comprising a plurality of pores;
   depositing a conducting layer on the first layer;
   anodizing the conducting layer to convert the conducting layer into a porous layer comprising a plurality of unconnected pores; and
   filling at least a portion of the plurality of unconnected pores at least partially with a filler, wherein the first layer is substantially free of the filler.

2. A method comprising:
   providing a first layer having a plurality of pores;
   disposing a conducting layer comprising an outer surface and an inner surface on the first layer;
   anodizing the conducting layer from the outer surface to convert the conducting layer into a porous layer such that a barrier layer is present at the interface between the first layer and the second layer;
   filling at least a portion of the plurality of unconnected pores at least partially with a filler, wherein the first layer is substantially free of the filler; and
   removing the barrier layer to obtain a membrane structure.

* * * * *